June 26, 1951 S. M. BRUDER 2,558,536

TELEPHONE CABINET

Filed Sept 12, 1947 2 Sheets-Sheet 1

INVENTOR

Samuel M. Bruder

By Randolph & Beavers

Attorneys

June 26, 1951 S. M. BRUDER 2,558,536

TELEPHONE CABINET

Filed Sept 12, 1947 2 Sheets-Sheet 2

Inventor

Samuel M. Bruder

By Randolph & Beavers

Attorneys

Patented June 26, 1951 2,558,536

UNITED STATES PATENT OFFICE 2,558,536

TELEPHONE CABINET

Samuel M. Bruder, Benton Harbor, Mich.

Application September 12, 1947, Serial No. 773,659

1 Claim. (Cl. 312—287)

The present invention relates to telephone cabinets and it consists in the combinations, constructions and arrangements of parts herein described and claimed.

It is an object of the invention to provide a telephone cabinet which will be simple and economical in construction and yet efficient in use.

A further object of the invention is the provision of a telephone cabinet which may be built into a building at the time of its construction or which may be added to a building already constructed.

Another object of the invention is the provision of a telephone cabinet which is adapted to be accessible at either one side or which may be made accessible from both sides of a wall.

Other and further objects of the invention will become apparent from a reading of the following specification taken in conjunction with the drawings, in which.

Figures 1, 2, 3, 8:
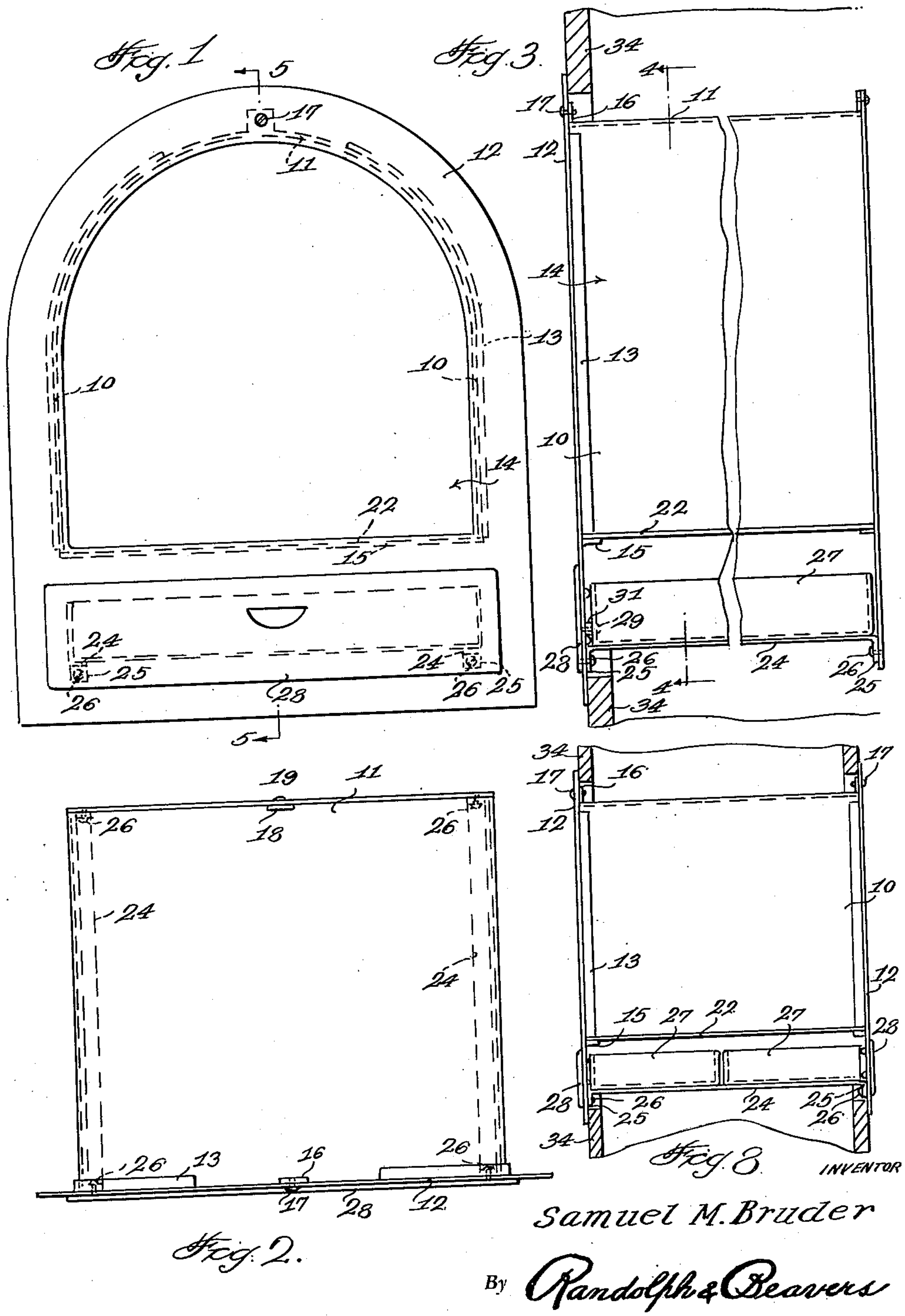
Figure 1 is a front elevational view of an embodiment of the invention.
Figure 2 is a plan view thereof.
Figure 4:
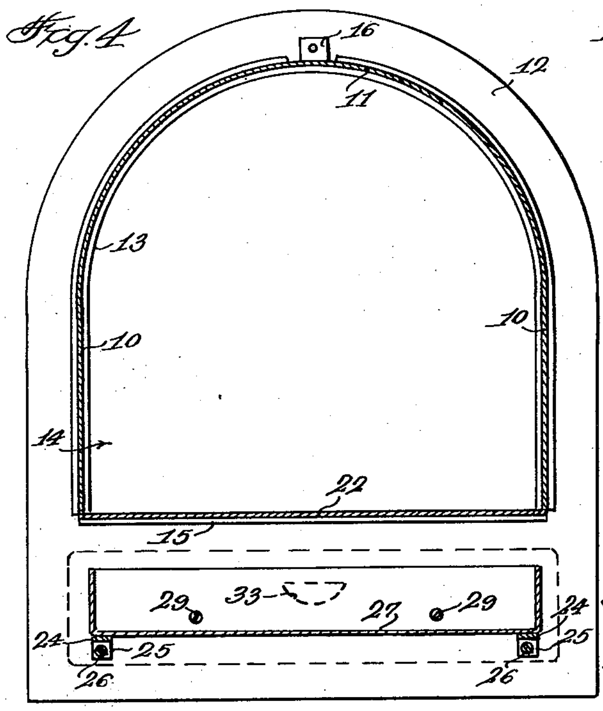
Figure 5:
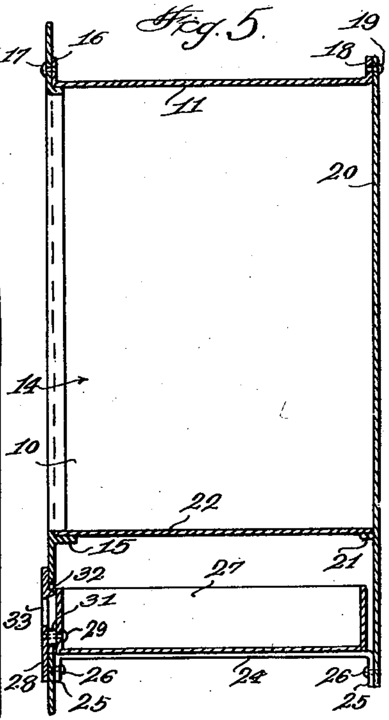
Figures 6, 7:
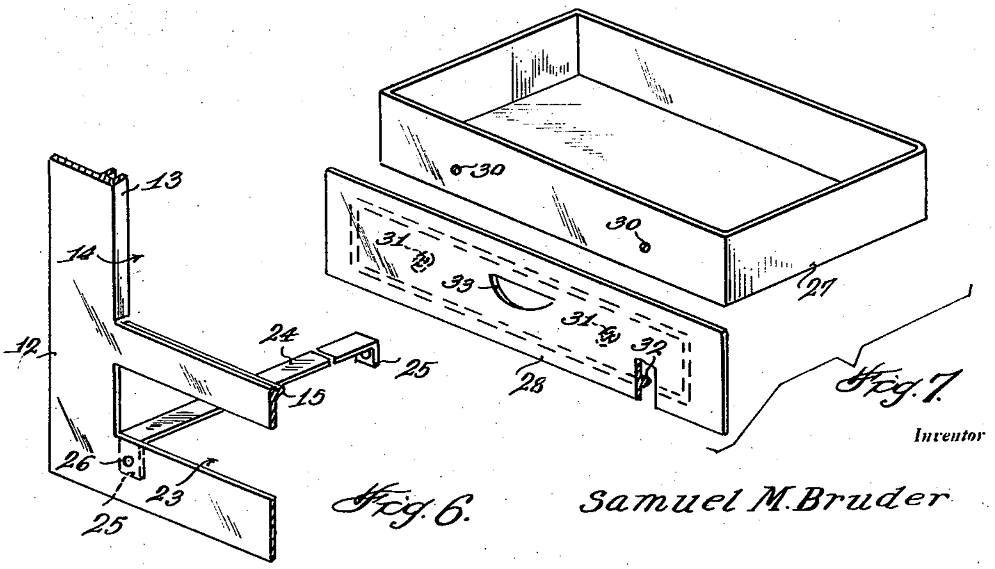

Figure 3 is a side elevational view of the device as mounted in a wall of a building, Figure 4 is a sectional view taken along line 4—4 of Figure 3, Figure 5 is a sectional view taken along line 5—5 of Figure 1, Figure 6 is a fragmentary perspective view illustrating certain details of construction, Figure 7 is an exploded perspective view of a drawer forming a part of the invention, and Figure 8 is a reduced view similar to Figure 3 showing a modified form the invention may take.

Generally, there is provided a telephone cabinet having sides and top formed of a single piece of material and preferably arched. A front panel is provided with an opening for a telephone and an opening for the reception of a drawer. Base plates or shelves are also provided for the support of the telephone and the drawer. In the preferred form of the invention, a rear wall is provided but a panel may be provided instead of the wall so that access may be had from both sides of the wall in which case a slidable drawer is mounted to be moved through each of the panels. The panels may be stamped or otherwise formed with decorative contours.

Referring now more particularly to the drawings, there is shown therein a telephone cabinet having sidewalls 10 and an integrally formed arched top wall 11.

A front panel 12 is provided with an inwardly extending channel 13 which lies adjacent a telephone-receiving opening 14, therein and which is adapted to receive the front edges of the walls 10 and top 11 therein.

Horizontally extending adjacent the lower edge of the opening 14 is an inwardly extending ledge 15 which is formed integrally with the panel.

Integrally and centrally formed with the front end of the top 11 is an upwardly extending dog 16 to which the upper end of the panel is attached by a screw 17 or the like.

To a similarly mounted dog 18 at the upper rear of the top 11 is affixed by a screw 19 a rear wall palte 20 of the same outer contour as the panel 12 but having no opening therein.

The wall plate 20 is provided with an inwardly extending ledge 21. A supporting plate 22 rests upon the ledges 15 and 21.

The panel 12 is provided with a rectangular opening 23 below the opening 14. A pair of shelf-supporting brackets 24 is provided at either end with a downwardly extending dog 25 which are attached to the panel 12 and plate 20 by screws 26.

A drawer 27 is adapted to be supported by the brackets 24 and slidably movable through the opening 23. The drawer is provided with a panel 28 attached thereto by screws 29 adapted to pass through openings 30 in the front wall of the drawer 27 and engage in bosses 31 carried at the rear of the panel 28. The panel 28 is provided with an inwardly extending flange 32 and an opening 33 providing a finger grip for the drawer.

In use, it will be apparent that when positioned in a wall 34, only the panels 12 and 28 are presented to view and that the plate 22 will support a telephone or, if desired, a radio and that the drawer 27 presents a convenient storage place for a telephone book, pencils, notepaper and the like.

In Figure 8, wherein identical reference characters are used to designate identical parts, instead of a wall plate 20, another panel 12 and drawer 27 are provided so that the telephone may be accessible from both sides of the wall 34 and in order that persons on both sides of the wall may have the convenience of a drawer for the usual accessories mentioned above.

While but two forms of the invention have been shown and described herein, it will be readily apparent to those skilled in the art that many minor modifications may be made without departing from the spirit of the invention or the scope of the appended claim.

What is claimed is:

A device of the character described comprising a top wall, side walls integrally formed with said top wall, a front panel having a telephone-receiving opening and a drawer-receiving opening therein and having a channel adapted to fit over the edges of said walls, a rear panel formed identically with the first mentionel panel, means for fastening the panels to the walls, inwardly extending ledges formed at the lower edges of the telephone-receiving openings of the panels, a telephone-supporting platform resting upon said ledges, supporting bars interconnecting the panels at points adjacent their lower ends and drawers slidably mounted in the drawer-receiving openings and adapted to be supported by said bars.

SAMUEL M. BRUDER.

REFERENCES CITED

The following references are of record in the file of this patent:

UNITED STATES PATENTS

| Number | Name | Date |
| --- | --- | --- |
| 1,273,494 | Imbriani | July 23, 1918 |
| 1,404,503 | Williams | Jan. 24, 1922 |
| 1,620,637 | Evans | Mar. 15, 1927 |
| 1,780,353 | Jones | Nov. 4, 1930 |
| 1,827,934 | Dawson | Oct. 20, 1931 |
| 1,874,776 | Martin | Aug. 30, 1932 |
| 2,317,296 | Nofzinger | Apr. 20, 1943 |
| 2,342,956 | Mills | Feb. 29, 1944 |